United States Patent [19]

Biggs

[11] Patent Number: 4,909,653

[45] Date of Patent: Mar. 20, 1990

[54] PIVOT JOINT

[75] Inventor: Peter J. Biggs, London, England

[73] Assignee: Trico Products Corporation, Buffalo, N.Y.

[21] Appl. No.: 323,596

[22] Filed: Mar. 14, 1989

[51] Int. Cl.$^4$ ............................................. F16B 1/00
[52] U.S. Cl. .................................. 403/24; 15/250.36; 403/67; 403/163
[58] Field of Search .................. 403/67, 161, 163, 24; 15/250.32, 250.35

[56] References Cited

U.S. PATENT DOCUMENTS 4,209,114  6/1980  Wilson et al. ...................... 403/67 X
4,286,351  9/1981  Mower et al. ................ 15/250.32 X Primary Examiner—Andrew V. Kundrat Attorney, Agent, or Firm—Biebel, French & Nauman

[57] ABSTRACT

A pivot joint (1) is provided for pivotting together a first member (2) and a second member (3), at least the first of which is of channel section at the joint and the second of which is adapted to seat within the first, the pivot joint (1) comprising a plastics joint body (4) of generally channel section adapted to sit within the first member (2) and to receive the second member (3) therewithin, the joint body (4) or first member (2) having a first pair of trunnion members (6) adapted to cooperate with apertures (8) in the first member (2) or the joint body (4) respectively and the joint body (4) having a second pair of trunnion members (9) extending inwardly and cooperating with a pair of aligned keyhole slots (12) provided in the outer surface of the second member (3).

8 Claims, 2 Drawing Sheets

PIVOT JOINT

This invention relates to a pivot joint which is particularly but not exclusively useful in the manufacture of windscreen wipers.

In the manufacture of windscreen wipers, a number of pivot joints are used, particularly between the various yokes and/or levers of the windscreen wiper blade.

Problems exist in the manufacture of windscreen wipers due to the necessity, very often, of pivoting metal parts together. These joints tend to be noisy and have a tendency to suffer from wear and corrosion. Various proposals have been made for overcoming these problems, for example, by the provision of plastics members between the metal parts of the joints, but these have not proved entirely satisfactory from a manufacturing standpoint although they have worked satisfactorily in use.

The present invention seeks to provide a new and improved pivot joint which is relatively inexpensive to manufacture and use and which overcomes or reduces some or all of the above problems.

According to the invention, there is provided a pivot joint for pivotting together first and second members, at least the first of which is of channel section at the joint and the second of which is adapted to seat within the first, the pivot joint comprising a plastics joint body of generally channel section adapted to sit within the first member and to receive the second member therewithin, the joint body or first member having a first pair of trunnion members adapted to cooperate with apertures in the first member or joint body respectively and the joint body having a second pair of trunnion members extending inwardly and cooperating with a pair of aligned keyhole slots provided in the outer surface of the second member.

Further according to the invention, there is provided a pivot joint for pivotting together first and second members, at least the first of which is of channel section at the joint and the second of which is adapted to seat within the first, the pivot joint comprising a plastics joint body of generally channel section adapted to sit within the first member and to receive the second member therewithin, the joint body having a first pair of aligned trunnion members adapted to cooperate with aligned apertures in the first member respectively and a second pair of trunnion members extending inwardly and cooperating with a pair of alinged keyhole slots provided in the outer side surfaces of the second member.

All the trunnion members may be coaxial.

Preferably, the second member is also of channel section in the region of the pivot joint and the keyhole slots therein comprise apertures extending through the material of the second member.

The invention will now be described in greater detail, by way of example, with reference to the drawings, in which.

Figure 1:
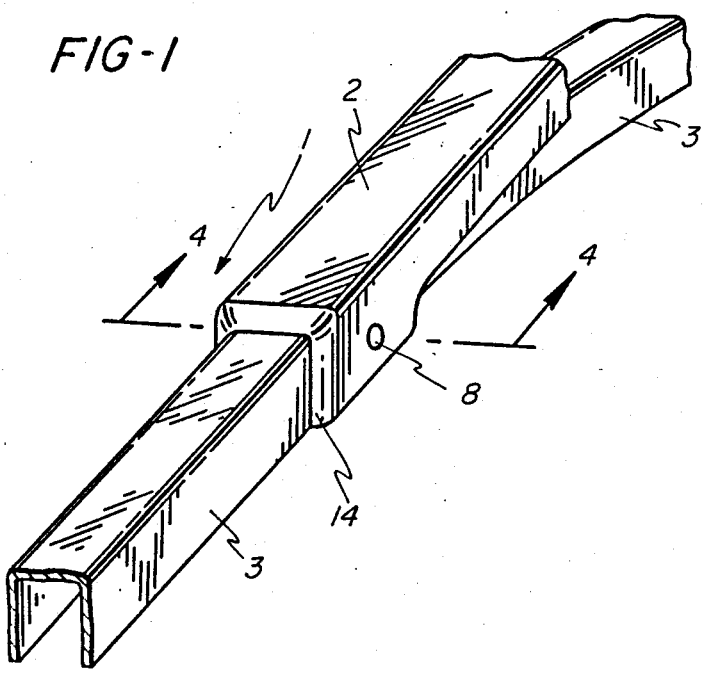
FIG. 1 is a perspective view of a completed pivot joint in accordance with the invention.

Referring firstly to FIG. 1 of the drawings, there is shown a pivot joint 1 between two members 2 and 3, the first of which (2) is the primary yoke 2 of the harness of a windscreen wiper blade and the second of which (3) is a secondary yoke of the harness. The two members 2 and 3 are pivotably connected together by means of a joint body 4 of plastics material which can be seen in greater detail in FIG. 2.

Figure 2:
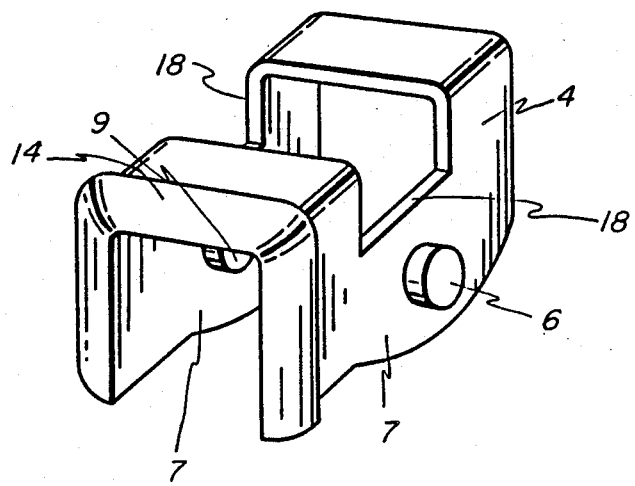
FIG. 2 is a perspective view of the joint body used in the construction of the pivot joint shown in FIG. 1.

As can be seen from FIG. 2, the joint body 4 comprises a generally channel sectioned member having a first pair of trunnion members 6 extending outwardly from the side walls 7 of the channel and adapted to cooperate with two aligned apertures 8 in the primary yoke 2. A second pair of trunnion members 9 is provided extending inwardly from the side walls 7 of the channel and adapted to cooperate with keyhole slots 12 provided in the second member or secondary yoke 3. These keyhole slots can be seen from FIG. 3. The joint body 4 is provided at one end with an enlarged portion 14 connected to the remainder of the joint body by a shoulder which, when the joint is assembled, fits against the end of the primary yoke 2 and will act both to protect the open end of the joint and alleviate the effect of end thrust on the joint. In addition, it also acts as an alignment aid when assembling the joint. It will also be seen that the base and part of the sides of the joint body 4 are cut away at 18 in the central region to increase the resiliency of the side walls.

Figure 3:
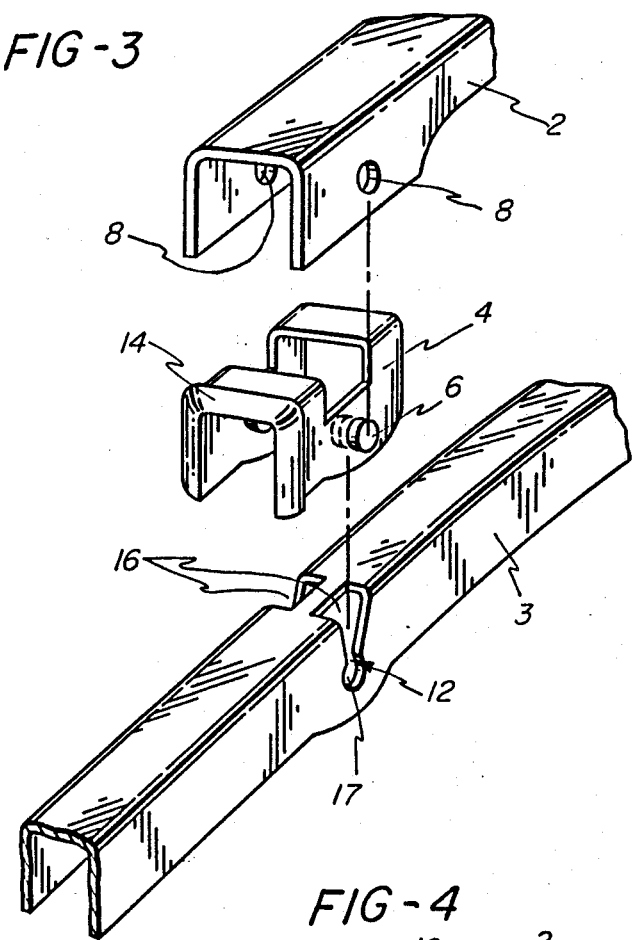
FIG. 3 is an exploded view of the parts of the joint shown in FIG. 1.
Figure 4:
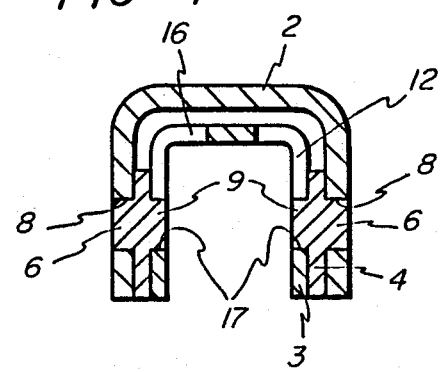
FIG. 4 is a sectional view of the joint taken on the line IV—IV of FIG. 1.

The assembly of the above described pivot joint will now be considered:

Referring in particular to FIGS. 3 and 4, the plastics joint body 4 is pushed upwardly into the channel section of the primary yoke 2, using the enlarged end portion 14 of the joint body 4 as a guide. The channel sides 7 of the joint body are pushed together to permit the exterior pair of trunnions to pass between the channel sides of the primary yoke 2. This operation can be successfully carried out if a suitable plastics material is chosen for the joint body 4. Once the joint body 4 has been pushed home into the primary yoke 2, the exterior pair of trunnion members 6 will be aligned with the apertures 8 in the primary yoke 2 and, by virtue of the resilience of the joint body, these members 6 will snap into the apertures 8, thus securing the joint body 4 within the primary yoke 2. It will be seen that, due to the shape of the joint body 4, the joint body 4 will be rigidly attached to the primary yoke 2 and no pivotting will take place between the joint body 4 and the primary yoke 2.

Next the secondary yoke 3 is offered up into the joint body 4 so that the inner pair of trunnion members 9 rest in the mouth 16 of the keyhole slots 12 in the secondary yoke 3. Once in position, force is applied between the primary and secondary yokes 2 and 3 so as to, push the inner pair of trunnions 9, with a click action, into the recesses 17 of the keyhole slots 12, thus securing the secondary yoke 3 to the joint body 4, and thus to the primary yoke 2, in pivotal fashion. In the particular construction shown, it will be seen that the pivotting takes place entirely between the secondary yoke 3 and the joint body 4.

Although in the case of a pivot joint for a windscreen wiper blade as shown there is no need for detachment of the joint, nevertheless, it is possible to detach the joint by applying the assembly steps in reverse should this be desired.

It will be appreciated that various modifications may be made to the above described embodiments without departing from the scope of the invention. For example, the cut away portions of the base and sides of the joint body can be omitted if desired provided that the plastics material used retains sufficient resiliency to allow the joint body to be inserted into the primary yoke. Instead of the exterior trunnions being provided on the joint body, the primary yoke could be provided with inwardly directed projections, for example, produced by indenting the side walls of the channel of the primary yoke 2, the projections cooperating with recesses provided within the joint body. The enlarged end part 14 of the joint body may be omitted if desired since, while it is useful in the pivot joint described, it is not essential to the functioning of the joint.

It will be appreciated that while the invention has been described in relation to the joint between primary and secondary yokes of a windscreen wiper harness, the invention is equally applicable to joints between secondary and further subsidiary yokes or levers of the harness. It should equally be noted that the invention is not limited to pivot joints in windscreen wipers but can be used in any circumstance where such a pivot joint might be useful.

From the above described embodiments it will be seen that a pivot joint has been described which is of relatively simple construction, which is inexpensive to manufacture and use and which provides an effective counter to the above stated problems with existing metal to metal joints.

I claim:

1. A pivot joint for pivotting together first and second members, at least the first of which is of channel section at the joint and the second of which is adapted to seat within the first, the pivot joint comprising a plastics joint body of generally channel section adapted to sit within the first member and to receive the second member therewithin, the joint body or first member having a first pair of trunnion members adapted to cooperate with apertures in the first member or joint body respectively and the joint body having a second pair of trunnion members extending inwardly and cooperating with a pair of aligned keyhole slots provided in the outer surface of the second member.

2. A pivot joint for pivotting together first and second members, at least the first of which is of channel section at the joint and the second of which is adapted to seat within the first, the pivot joint comprising a plastics joint body of generally channel section adapted to sit within the first member and to receive the second member therewithin, the joint body having a first pair of aligned trunnion members adapted to cooperate with aligned apertures in the first member and a second pair of trunnion members extending inwardly and cooperating with a pair of aligned keyhole slots provided in the outer side surfaces of the second member.

3. A pivot joint as claimed in claim 2, wherein all the trunnion members are coaxial.

4. A pivot joint as claimed in claim 2, wherein the second member is also of channel section in the region of the pivot joint and the keyhole slots therein comprise apertures extending through the material of the second member.

5. A pivot joint as claimed in claim 4, wherein the stems of the keyholes of the keyhole slots extend into the base of the channel of the second member.

6. A pivot joint as claimed in claim 2, wherein the base of the channel of the joint body is cut away between the ends of the joint body so as to increase the resilience of the side walls thereof.

7. A pivot joint as claimed in claim 2, wherein the joint body is substantially fixed relative to the first member and is pivotable relative to the second member.

8. A pivot joint as claimed in claim 1, wherein the two members are yokes or levers of the harness of a windscreen wiper blade.

* * * * *